W. J. BUSSINGER.
MEASURING DEVICE FOR FLUID PUMPS.
APPLICATION FILED JUNE 18, 1908.
910,458.
Patented Jan. 19, 1909.
2 SHEETS—SHEET 2.
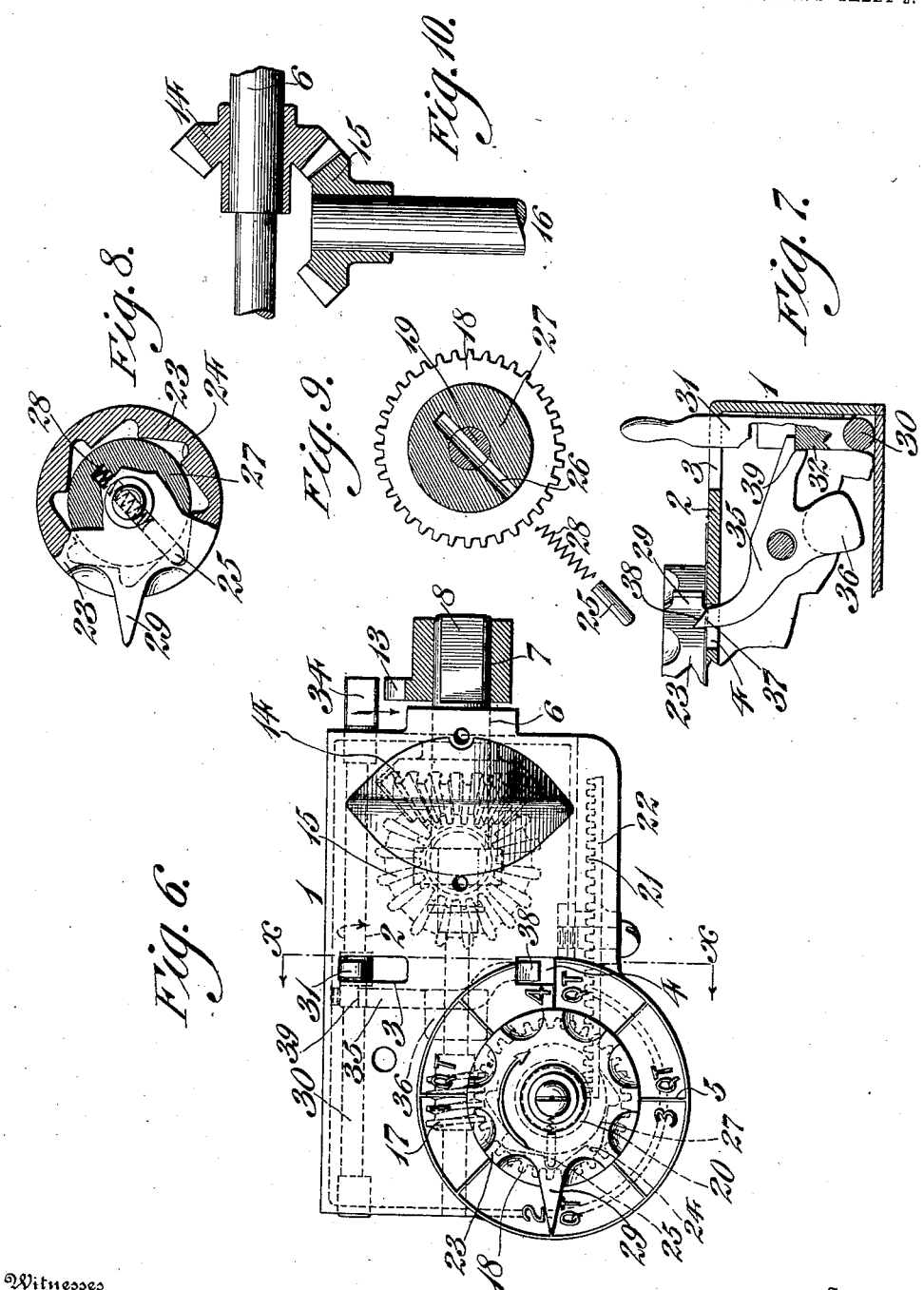

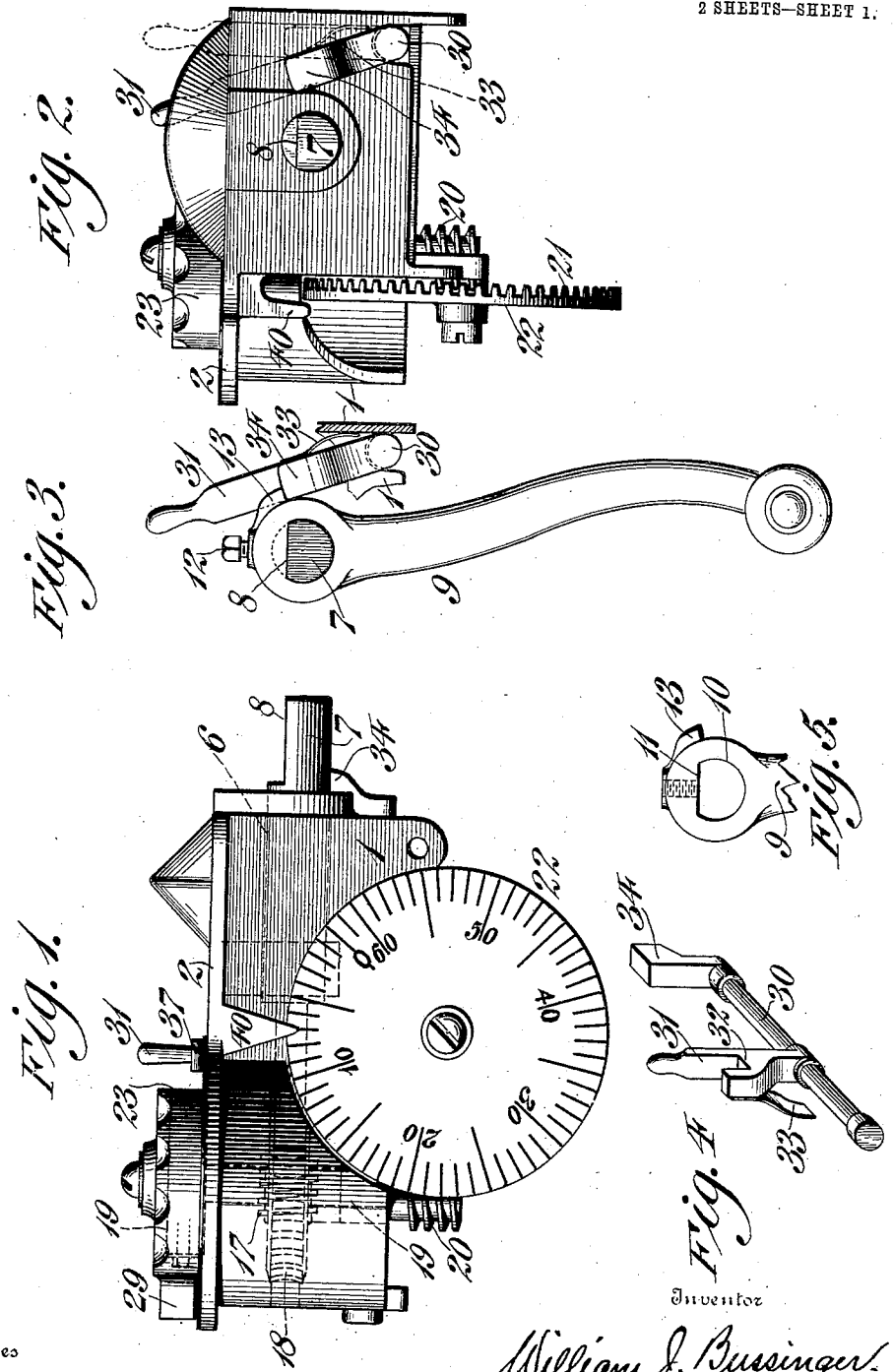

UNITED STATES PATENT OFFICE.

WILLIAM J. BUSSINGER, OF PHILADELPHIA, PENNSYLVANIA, ASSIGNOR TO NATIONAL SPECIALTY MANUFACTURING COMPANY, OF PHILADELPHIA, PENNSYLVANIA, A FIRM.

MEASURING DEVICE FOR FLUID-PUMPS.

No. 910,458.        Specification of Letters Patent.        Patented Jan. 19, 1909.

Application filed June 18, 1908. Serial No. 439,145.

*To all whom it may concern:*

Be it known that I, WILLIAM J. BUSSINGER, a citizen of the United States, residing in the city and county of Philadelphia, State of Pennsylvania, have invented a new and useful Measuring Device for Fluid-Pumps, of which the following is a specification.

My invention relates to a measuring device for fluid pumps and consists of means for accurately measuring and recording the amount of fluid withdrawn and for stopping the mechanism when the proper amount has been withdrawn.

It further consists of other novel features of construction, all as will be hereinafter fully set forth.

Figure 1 represents a side elevation of a measuring device embodying my invention. Fig. 2 represents an end elevation thereof. Fig. 3 represents a portion of the device in detached position, showing the operating handle and means for stopping the same. Fig. 4 represents a perspective view of a rocking shaft employed. Fig. 5 represents an elevation of the end portion of the handle. Fig. 6 represents a plan view of the device. Fig. 7 represents a sectional view of a portion of the device on line $x$—$x$, Fig. 6. Fig. 8 represents a plan view of the disk employed showing a portion of the top broken away. Fig. 9 represents a plan view of a portion of the device in detached position. Fig. 10 represents in elevation the gears employed.

Similar numerals of reference indicate corresponding parts in the figures.

Referring to the drawings, I have found in measuring devices for fluid pumps that it is necessary that the same should be accurate and should be constructed with as few complications as possible in order that there will be but few parts, which reduces the liability of the device to get out of order. My invention is designed to accomplish these results and in the drawings, I have shown a construction which operates successfully in practice but it will be understood that various changes may be made in the construction, the arrangement of the parts may be varied and other instrumentalities may be employed which will come within the scope of my invention and I do not therefore desire to be limited in every instance to the exact construction as herein shown and described but desire to make such changes as may be necessary.

1 designates a casing which is suitably supported having a top plate 2 formed with openings 3 and 4 and upon the surface of which I form or place an indicator 5 of any desired form. In the drawings, referring more especially to Fig. 6, I have shown the indicator as formed circular and with divisions to indicate half quarts. Rotatably mounted in said casing is a shaft 6 having the projecting end 7 provided with a flat portion 8, said projecting portion being adapted to receive the handle 9 which is formed with the opening 10 having a flat wall 11 adapted to contact with the flat portion 8 of the projecting portion 7, a suitable set screw 12 being adapted to lock the handle and shaft together. In the drawings, I have shown the handle 9 as provided with a lug 13 although it will be understood that if desired the lug may be placed at any suitable point. On said shaft 6 is the beveled gear 14 which meshes with the gear 15 carried by the rod 16 of the pump, not shown, and as the remaining portion of the pump is of any desired form, I have not deemed it necessary to illustrate the same. 17 designates a worm carried by said shaft 6 which meshes with the worm wheel 18 carried on the vertical shaft 19 which is suitably supported by the casing. 20 designates a worm carried by said shaft 19 which meshes with the circular gear 21 which is suitably supported. On the face of said gear 21, in the present instance, I provide a scale 22, although said scale can be made in any other suitable manner, as desired, but adapted to be rotated by movement of said circular gear 21.

23 designates a disk having teeth 24 on the inner wall thereof with which a pawl 25 is adapted to engage, the said pawl in the present instance being seated in a suitable recess 26 in the head 27 carried by the shaft 19, said recess 26 also receiving the spring 28 which bears against said pawl and tends to hold the same in engagement with one of the teeth 24 but permitting inward movement of the pawl 25, so that said disk can be rotated, manually, in the direction indicated by the arrow in Fig. 6, without imparting motion to said shaft 19 and said pawl 25 being so arranged as to rotate with said shaft 19 and as said pawl will be in engagement with one of the teeth 24 it will thus positively impart motion to said disk 23, when said shaft 19 is rotated. 29 designates a pointer carried by said disk which latter it will be understood is suitably situated with respect to said indicator 5 so that said pointer in its rotation will move around with respect to the graduations of said indicator, it being understood that said pointer in its movement will pass over the opening 4 in the wall of the top plate 2 of the casing 1.

30 designates a rock shaft which is suitably supported in the casing and from which the bar 31 projects upwardly through opening 3 in which it is moved, said bar having a shoulder 32 thereon and carried by said bar and situated between it and the wall of the casing is a spring 33 for normally throwing the bar into the position seen in Figs. 2 and 3. Carried on said bar and exterior of the casing is a stop or projecting portion 34 which in the normal position of the rock shaft 30 is adapted to be situated in the path of movement of the lug 13 carried by the handle 9 and it is held in this position by means of the spring 33.

Rotatably supported upon the shaft 7 is the lever 35 having a weight 36 thereon and having the nose or end 37 seated and movable in said opening 4 in the top plate 2 of the casing and when in proper position said nose projects above the plane of the top plate 2, said nose having an inclined face 38 which is adapted to be engaged by the pointer 29 at the proper time, a suitable portion of the lever having a shoulder 39 thereon adapted to engage with the shoulder 32 on the bar 31, it being understood that the normal position of said weighted lever 35 is such that the nose 37 projects upwardly through the opening 4 in the path of movement of said pointer.

The operation of the parts as described is as follows: The measuring device being connected to the pump which is in the barrel containing the fluid and the handle 9 being attached to the projecting portion 7 of the shaft 6, the parts are ready for operation. The quantity of fluid to be withdrawn having been determined, as for example, two quarts, the disk 23 is manually operated or turned until the pointer 29 is placed at the point on the indicator 5 which shows two quarts, this being shown in Fig. 6, and the free rotation of the disk 23 being permitted by reason of the resilient bearing of the pawl 25 which is forced inwardly as the inclined faces of the teeth 24 contact therewith, it being understood that when the pointer 29 is properly placed that the pawl 25 is in engagement with one of the teeth 24. At the same time the bar 31 is forced over manually against the tension of the spring 33 into the position seen in Fig. 7, whereupon the weight 36 on the lever 35 will place the same in such position that the shoulder 39 thereon engages with the shoulder 32 on the bar 31 and the nose portion 37 of the lever projects upwardly into the path of movement of the pointer 29. The handle 9 is now rotated which rotates shaft 6 and worm 17 imparting movement to the beveled gear 14 and beveled gear 15 to actuate the pump through rod 16. At the same time the worm 17 meshing with the gear 18 rotates the same and with it the shaft 19. This will rotate the disk 23 carrying around the pointer and will also rotate through the medium of the worm 20 the gear 21. The disk 23 will be rotated until the pointer reaches the inclined face 38 of the nose portion 37 and will depress the same removing the shoulder 39 from engagement with the shoulder 32 on the bar 31 whereupon the spring 33 will immediately force over the rock shaft 30 carrying with it the stop 34 and move the same into the path of movement of the lug 13 which will contact therewith and prevent further rotation of the handle and consequently of the shaft 6, it being understood that the operation of the pump will likewise cease and the two quarts of fluid will have been discharged therefrom into a suitable receptacle.

The disk or scale 22 is so arranged with respect to the rotation of the disk 23 that it will indicate the total amount of fluid which has been withdrawn, a suitable pointer 40 being provided upon the casing 1, in the present instance, said pointer being connected with the top plate 2 thereof and which shows the total amount of the fluid which has been withdrawn, it being understood that each indicating line of the disk in the present instance denotes one gallon, so that for one complete revolution of the disk 23 will mean that four quarts have been withdrawn and the disk 22 will move from one indicator line to the next with respect to the pointer 40. The parts can now be returned to their proper position for another withdrawal of the fluid and if in this case four quarts are to be withdrawn, the pointer 29 is placed at the point indicating four quarts, by hand, without actuating the pump mechanism and the bar 31 is returned to the position seen in Fig. 7, so that when the handle 9 is rotated, the disk 13 will be rotated until the pointer can strike the nose portion 37 to depress the weighted lever 35, as before, when the parts are again actuated to stop the operation of the pump.

Having thus described my invention, what I claim as new and desire to secure by Letters Patent, is:

1. In a measuring device, a shaft, a rotary disk operatively connected therewith, a lug on said shaft, a rock shaft, means normally locking said rock shaft and actuated by said disk for releasing said rock shaft and means for moving said rock shaft into the path of movement of said lug.

2. In a measuring device, a shaft, a rotary disk operatively connected therewith, a lug on said shaft, a rock shaft, a spring for actuating said shaft, and means normally locking said rock shaft and actuated by said disk for releasing the same.

3. In a measuring device, a casing having openings therein, a shaft rotatably supported in said casing, a rotary disk, means for supporting said disk adjacent one of said openings, a lug on said shaft, means for rotating said disk, a rock shaft, a lever normally locking said rock shaft and having a portion thereof projecting through the opening adjacent said disk, and adapted to be depressed at the proper time by said disk for releasing said rock shaft.

4. In a measuring device, a casing having openings therein, a shaft rotatably supported in said casing, a lug on said shaft, a rotary disk supported adjacent one of said openings, connections between said disk and shaft whereby said disk is rotated, a rock shaft suitably supported, a spring bearing against said rock shaft for normally holding the same in one position, a lever adapted to engage said rock shaft for holding the same in one position and having a portion thereof projecting through the opening adjacent said disk, said portion being adapted to be depressed by said disk for releasing said rock shaft, and means on said rock shaft projecting through the other opening for manually actuating said shaft.

5. In a measuring device, a shaft, a rotary disk operatively connected therewith, a lug carried by said shaft, a rock shaft having a stop thereon, a bar projecting from said shaft, a spring bearing against said bar for actuating said rock shaft for moving said stop into the path of movement of said lug, and a weighted lever suitably supported, adapted to engage with said bar for locking said shaft and having a portion thereof projecting into the path of movement of said disk and adapted to be depressed thereby for releasing said shaft.

6. In a measuring device, a shaft, a second shaft adapted to receive motion from said first mentioned shaft, a rotary disk, a pawl connecting said disk with said second shaft, whereby said disk is rotated therewith but is free to be rotated manually in the opposite direction, a rock shaft, a lever adapted to lock said rock shaft in one position and having a portion thereof adapted to be depressed by said disk for releasing said rock shaft, and a spring for actuating said rock shaft.

7. In a measuring device, a shaft, a rotary disk operatively connected therewith, a lug actuated with said shaft, a rock shaft and a weighted lever normally locking said rock shaft and actuated by said disk for releasing said rock shaft, and means for moving said rock shaft into the path of movement of said lug.

8. In a measuring device, a shaft, a rotary disk operatively connected therewith, a lug actuated with said shaft, a rock shaft, a lever for locking said rock shaft, and actuated by said disk for releasing said rock shaft, a weight on said lever for moving the same into locking position, and means for moving said rock shaft in the path of movement of said lug.

9. In a measuring device, a shaft, a lug carried by said shaft, a pointer manually adjustable from a normal position and returnable thereto by the movement of said shaft, a rock shaft having a portion thereof adapted to be moved in the path of movement of said lug, and means normally locking said portion out of said path and actuated by said pointer for causing said lug to engage with said portion.

10. In a measuring device, a shaft, a lug carried by said shaft, a pointer manually adjustable from a normal position and returnable thereto by the movement of said shaft, an indicator whereby the proper position for setting said pointer is determined, a rock shaft having a portion thereof adapted to be moved into the path of movement of said lug, means normally locking said portion out of said path and actuated by said pointer for causing said lug to engage said portion, and a scale adapted to be suitably actuated for indicating amount of fluid withdrawn.

11. In a measuring device, a shaft, a handle suitably connected with said shaft, a lug on said handle, a pointer normally adjustable from a normal position and returnable thereto by the movement of said shaft, a rock shaft having a stop thereon adapted to be moved into the path of movement of said lug, a lever for locking said rock shaft whereby said stop is held out of the path of movement of said lug, means for actuating said lever, whereby said rock shaft is released, and a spring for moving said stop into the path of movement of said lug.

WILLIAM J. BUSSINGER.

Witnesses:
C. D. McVay,
F. A. Newton.